United States Patent
Maki et al.

(10) Patent No.: US 6,455,602 B1
(45) Date of Patent: Sep. 24, 2002

(54) HIGH-SPEED PROCESSABLE CELLULAR INSULATION MATERIAL WITH ENHANCED FOAMABILITY

(75) Inventors: Sandra Maki, Beaconsfield (CA); Geoffrey David Brown, Bridgewater, NJ (US); Scott Hanley Wasserman, Morganville, NJ (US); David John Frankowski, Milltown, NJ (US); Vicky Yafen He, Brooklyn, NY (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/694,853

(22) Filed: Oct. 24, 2000

(51) Int. Cl.$^7$ ................................................ C08L 47/00
(52) U.S. Cl. ........................ 521/136; 521/140; 521/142; 521/144; 525/191; 525/232; 525/240; 174/110 F; 174/110 PM; 174/110 SR
(58) Field of Search ................................... 521/144, 142, 521/136, 140; 525/191, 240, 232; 174/110 F, 110 PM, 110 SR

(56) References Cited

U.S. PATENT DOCUMENTS

| | | | |
|---|---|---|---|
| 5,837,939 A | 11/1998 | Cieloszyk et al. | .... 174/110 PM |
| 5,998,558 A | 12/1999 | Wasserman et al. | ..... 526/348.6 |

*Primary Examiner*—James J. Seidleck
*Assistant Examiner*—Melanie Bissett

(57) ABSTRACT

An expandable composition comprising:

(A) about 60 to about 98 percent by weight of a polyolefin or mixture of polyolefins wherein the polyolefin or mixture has an $\eta 0$ of less than about 9.0 kilopascal.seconds (kPa.s), a Jr greater than about $50 \times 10^{-5}$/pascals (Pa), and an Ea greater than about 6.7 kilocalories per mole (kcal/mol); and (B) about 2 to about 40 percent by weight of a polyolefin or mixture of polyolefins having an nRSI greater than about 4.5, and no greater than about 19; or (C) a polyolefin or mixture of polyolefins wherein the polymer or mixture has an $\eta 0$ of less than about 9.0 kilopascal.seconds, a Jr greater than about $50 \times 10^{-5}$/pascals, an Ea greater than about 6.7 kilocalories/mole, and an nRSI greater than about 9.

13 Claims, No Drawings

HIGH-SPEED PROCESSABLE CELLULAR INSULATION MATERIAL WITH ENHANCED FOAMABILITY

TECHNICAL FIELD

This invention relates to a polyolefin composition for cellular insulation that has improved capability to be processed at high line speeds with enhanced foamability.

BACKGROUND INFORMATION

Thin wall insulated wires incorporating foamed polyolefin insulating materials are commonly used in local area network (LAN), wiring and outdoor "telephone" cables. These insulated wires are typically produced using a wire coating extrusion process operating at production speeds ranging from about 500 to about 3000 meters per minute. Increased production speeds are desired for increased productivity resulting in improved production economics, but can be limited by the capability of the insulation material to be extruded as a very uniform foamed insulation layer within physical and electrical production tolerances. Very uniform cellular insulation is especially important to data-grade transmission characteristics, which are commercially evolving toward increasingly stringent requirements. Productivity can also be improved by increasing the foaming capability of the insulation to provide higher expansion rates, allowing reduced insulation thickness and material use.

Foaming can be accomplished by chemical foaming agents or by physical gas injection into the extruder during the high speed insulated wire production process. The insulated wire can be a single foamed insulation layer, or can be a multi-layer design such as the insulation widely used in telephone cables, which has a foamed inner skin and a solid outer skin. The foamed polyethylene insulation provides some improved electrical properties, for example, higher velocity of propagation and/or lower attenuation, versus solid (not foamed) polyolefin insulation. Foaming also improves cable economics via reduced insulation weight and decreased insulation thickness yielding decreased cable dimensions.

Thin wall cellular insulated wire for LAN or telephone cable use is typically twisted in a helical manner with another similar insulated wire to form a "twisted pair" transmission circuit. The insulated wires are usually colored to provide color coded transmission pairs that facilitate installation into communication networks. Multiple transmission pairs are usually grouped together, often by additional helical twisting, to form a transmission core. The transmission core is then protected by a sheathing system which incorporates a polymeric jacketing to provide mechanical and environmental protection. Often metallic armor and/or multiple jacketing layers are included in the sheathing system for added environmental protection, especially for outdoor cables. With outdoor cables, hydrocarbon greases are often used to fill air spaces in the cable, such as the interstices between the twisted pairs in the transmission core, to minimize the possibility of deterioration in electrical transmission performance by water/moisture ingress. Various other components such as polymeric wraps or metallized shields for electromagnetic interference (EMI) protection and flame retardancy are often incorporated into the cable design, especially for LAN cable applications. For indoor applications such as LAN cables, the cable usually must meet certain flame retardancy standards, which can affect material selection and cable design.

The selection of the polyolefin insulating material(s) is a critical factor in determining the production speeds and end-use performance capabilities for high speed thin wall cellular insulation applications. The best available commercial materials have limited production capabilities such that improved materials are very much desired. For example, existing commercial materials used in a physical foaming process for production of thin wall foamed insulated wires for LAN data-grade applications typically lack good high speed extrusion characteristics. Therefore, production speeds are typically limited to about 1500 meters per minute or less. Attempted production above such speeds typically results in insulation roughness with increased capacitance and diameter variations, yielding unacceptable electrical transmission characteristics. Despite production speed limitations, these resins have been used commercially for LAN applications due to good foamability that allows for expansion rates up to 65 percent. Until the present invention, other resins having better high speed extrusion capability lacked the desired foaming capability. Another example is the multilayer foam/skin telephone wire application in which chemically expanded foams are typically used. Commercial materials traditionally used in this application have good high speed extrusion characteristics but lack optimal foaming capability. Such materials allow for foam/skin production at speeds up to about 3000 meters per minute or more but their limited foaming capability restricts use to about a 45 percent maximum expansion level. Attempts to foam these materials above about a 45 percent expansion yields unacceptable foam quality and insulation variations that exceed allowable tolerances for acceptable electrical transmission characteristics. Due to the ability of processing at high production rates, existing commercial materials have been used despite their limited foaming capability.

Thus a base resin system providing a combination of improved high speed extrusion capability and improved foaming capability will provide substantial product improvement. Such an improved composition for cellular insulation would enable increased production speeds for, for example, gas injection foamed LAN insulation, and increased foaming capability for, for example, chemically foamed telephone wire insulation. This would improve productivity via increased output rates and increased expansion rates providing reduced material consumption.

The production of a chemically foamed insulation typically comprises the following steps. A chemical blowing agent is melt mixed, or compounded, with the base resin system at a temperature below the decomposition temperature of the selected blowing agent. The melt is then pumped through a pelleting dieplate and a pelleter/cutter to produce small pellets (solid beads) which are then cooled to solidification temperature in water. This pelleted composition is then used as the raw material for the foamed insulation extrusion process. It is also possible to obtain a chemical foam insulation composition by combining several constituents in the proper ratios at the fabrication extruder. For example, a pellet mixture comprising the proper ratio of base resin components and a chemical blowing agent masterbatch could be dry blended and then fed directly to the fabrication extruder.

To fabricate the foamed insulation, the specified composition is typically processed in a fabricating extruder for coating onto a conductor. In the fabricating extruder, the pellets are fluxed and mixed and the melt is then brought to a processing temperature exceeding the decomposition temperature of the blowing agent, thereby producing gas for the foaming process. As the melt passes through the coating die, forming a coating around the wire to be insulated, the dissolved gas nucleates and forms tiny cells in the plastic coating. This foaming mainly occurs in an air gap between the die exit and a water cooling trough, in which the insulation is solidified. Chemically foamed insulation is widely used because the required equipment investment is lower and because the operation has competitive processing capabilities relative to the physical foaming process, at lower expansion rates, especially for foam/skin telephone wire insulation production.

For high speed foam/skin telephone wire applications, commercially available chemically expanded foam materials have good cellular insulation processing capability to about 45 percent expansion. As noted above, typical foam/skin production line speeds range from 1500 to 3000 meters per minute. For other chemically foamed insulation processes, notably coaxial cables which are produced to larger diameters at considerably slower production speeds (less than approximately 200 meters per minute), expansion rates of up to 60 percent have been achieved. New chemical foam compositions are being developed which will boost expansion rates to about 70 percent for the larger diameter coaxial cable foam applications, but these compositions fail to have the capability for processing at high line speeds and have very delicate processing characteristics.

The expansion limit of an insulation material is determined both by material and extrusion process capabilities to produce a foamed insulation with good cell uniformity and dimensional control. As previously noted, good cellular insulation uniformity is needed to maintain electrical transmission characteristics within tight target ranges.

Physical foaming processes use a gas that is physically pumped into the polymer melt in the barrel of the fabricating extruder instead of being generated in situ with a chemical blowing agent. Chlorofluorocarbon gases such as monofluorotrichloromethane, difluorodichloromethane, trifluorotrichloroethane, and tetrafluorodichloroethane were historically used in gas injection processes to obtain highly foamed insulation with 80 percent (by volume) expansion or more. Chlorofluorocarbon gases, however, are being phased out because of their negative environmental impact. Other gases such as argon, carbon dioxide and especially nitrogen are now typically used and show somewhat increased difficulty in achieving a uniform fine foaming structure in the fabricated insulation. The conversion from chlorofluorocarbon gases to inert gases requires screw design modifications in order to achieve comparable expansion rates due to the lower solubility of these gases in polyolefins such as polyethylene. Production speed capabilities will vary over a considerable range depending upon materials used, the equipment and operating conditions used, the insulation design (multiple or single layers) and allowed production tolerances. For larger diameter coaxial cable compounds, gas injection foaming to 80 percent expansion is commercially practiced with relatively low line speeds (less than 500 meters per minute). On the other hand, production speeds up to 1500 meters per minute are possible in thin wall cellular insulation applications where expansion levels are reduced, typically to about a 50 percent expansion level. The production rates and expansion levels for thin wall cellular insulation by the gas injection process are limited by the availability of commercial polyolefin materials having both good foaming capability and good high speed extrusion characteristics.

DISCLOSURE OF THE INVENTION

An object of this invention, therefore, is to provide a resin composition that can be extruded at high speeds and exhibits an enhanced foaming capability, i.e., high expansion, for thin wall cellular insulation by the use of chemical or physical foaming. Other objects and advantages will become apparent hereinafter.

According to the present invention, the object is met by the following expandable resin composition.

The composition comprises:

(A) about 60 to about 98 percent by weight of a polyolefin or mixture of polyolefins wherein the polyolefin or mixture has an $\eta 0$ of less than about 9.0 kilopascal.seconds (kPa.s), a Jr greater than about $50 \times 10^{-5}/$pascals (Pa), and an Ea greater than about 6.7 kilocalories per mole (kcal/mol); and (B) about 2 to about 40 percent by weight of a polyolefin or mixture of polyolefins having an nRSI greater than about 4.5, and no greater than about 19; or (C) a polyolefin or mixture of polyolefins wherein the polymer or mixture has an $\eta 0$ of less than about 9.0 kilopascal.seconds, a Jr greater than about $50 \times 10^{-5}/$pascals, an Ea greater than about 6.7 kilocalories/mole, and an nRSI greater than about 9.

DESCRIPTION OF THE PREFERRED EMBODIMENT(S)

In a preferred embodiment, component (A) and component (B) are present in the composition at levels of about 75 to about 98 percent by weight and about 2 to about 25 percent by weight, respectively. In a most preferred embodiment, component (A) and component (B) are present in the composition at levels of about 88 to about 98 percent by weight and about 2 to about 12 percent by weight, respectively.

Component (A) is such that, under processing conditions, bubbles comprising the developing foam and generated by chemical or physical means can grow easily in the polymer melt without significant coalescence. Ease of bubble growth and resistance to bubble coalescence are attained by a low zero-shear viscosity $\eta 0$ and high recoverable compliance (Jr), respectively. It is understood by those familiar with rheological methods that resistance to bubble coalescence is also often characterized by high melt strength or, in other words, a molecular structure that leads to high flow activation energy (Ea).

Component (B) is a shear thinning agent such that extrusion performance and surface appearance of the composition are enhanced relative to component (A) alone without detrimentally affecting foamability. The ability to enhance extrusion performance is characterized by a high value for the normalized relaxation spectrum index (nRSI). Materials other than component (B) or component (B) at higher or lower fractions of the overall composition will fail to enhance extrusion performance without detrimentally affecting foamability.

With respect to components (A) and (B):

$\eta 0$ is preferably less than about 7.0 kilopascal.seconds, and most preferably less than about 5.0 kilopascal.seconds.

Jr is preferably greater than about $60 \times 10^{-5}/$pascals, and most preferably greater than about $70 \times 10^{-5}/$pascals.

nRSI is preferably greater than about 8, and most preferably greater than about 9.

Component (C) is a composite of components (A) and (B), though not necessarily a mixture of more than one polyolefin. In this case, rheological measurements are made on the composite rather than on component (A) or component (B). Preferred ranges are as above for η0, Jr, and Ea. nRSI, however, is preferably greater than about 9.5 and, most preferably, greater than about 10.

In a practical sense, for components (A) and (B) or component (C), η0 is preferably no less than about 0.1 kilopascal.seconds, Jr is preferably no greater than about $150 \times 10^{-5}$/pascals, and Ea is preferably no greater than about 15 kilocalories/mole.

The described composition, particularly in its preferred and most preferred embodiments, will have the desired balance of high speed extrudability and enhanced foamability, regardless of whether the polymeric material has been formed in a single or multiple reactor process, with one or more catalysts or catalyst systems, as an in situ blend or with post-reactor processing, or by gas phase or other polymerization process such as liquid phase or in solution.

The η0, Jr, nRSI, and Ea of a polymeric material are simultaneously or separately determined by first subjecting the material to a shear deformation, and then measuring its response to the deformation using a rheometer.

The η0 and Jr of a polymeric material are calculated from the measured strain during the application of or recovery from an applied constant stress. During application of a constant stress, a polymeric material will increase its strain at a rapid rate until eventually assuming steady state behavior during which the rate of strain increase is constant. The η0 is calculated as the applied stress divided by the rate of change of the time-dependent strain during steady state behavior, or $$\eta 0 = \sigma/(\delta \gamma/\delta t)_{ss}$$

where σ is the applied stress. The Jr of a polymeric material is calculated either from an extrapolation of the steady state time-dependent strain data to zero time, or preferably from the asymptotic value of the extent of strain recovery following relaxation of the applied stress, or $$Jr = [\gamma_r(0) - \gamma_r(t)]/\sigma \text{ (as } t \text{ approaches infinity)}$$

where $\gamma_r(0)$ and $\gamma_r(t)$ refer to the measured strain at the start of and at some time during recovery from the applied stress, respectively.

For η0 and Jr, there are blending rules found in the literature that are based, to some extent, on molecular theory. For a two-component blend [component 2 having a higher molecular weight (MW) than component 1], they are:

$$\log(\eta 0_b) = a \log(w_1 \eta 0_1^{1/a} + w_2 \eta 0_2^{1/a})$$

where $w_1$ and $w_2$ are the respective weight fractions in the blend for component 1 and component 2 respectively, a is the exponent in the well known viscosity-MW relationship, with a value usually in the range of 3.4 to 3.6, and $$Jr_b = w_1 Jr_1 (l_1 \eta 0_1/\eta 0_b) + w_2 Jr_2 (l_2 \eta 0_2/\eta 0_b)$$

where $l_1$ and $l_2$ are parameters related to the shift of a characteristic longest relaxation time $(\lambda_i)$ of the respective component in the blend relative to that of a pure component $$l_i = \frac{\lambda_{i,b}}{\lambda_{i,pure}}.$$

The characteristic longest relaxation time $(\lambda_i)$ is defined as in the literature. In the above, parameters with the "b" subscript refer to those for the blend, while those with a numerical subscript refer to those of the pure components (note that η0 for the blend is required for the calculation of Jr for the blend). If one assumes that the relaxation times for the components in the blend are the same as the relaxation times as pure components, all of the l-values are 1.0. In a blend of a high and a low MW component, since the relaxation time of a high MW component is generally less than that in its pure component state, and since the relaxation time of a low MW component is generally higher, $l_1$ tends to be greater than 1, while $l_2$ tends to be less than 1.

The key to predicting Jr for the blends of interest is to find a rigorous method for estimating the time shift factors ($l_1$ and $l_2$) for any combination of components. For low MW polymers, the following relationship is proposed:

$$l_i = \frac{\eta_b M_i}{\eta_i \overline{M}_w} \qquad (1)$$

which becomes $$l_i = \left(\frac{\eta_b}{\eta_i}\right)^{(a-1)/a} \qquad (2)$$

after substituting for the viscosities and then the molecular weights of the blend and the pure component using the well known viscosity-MW relationship $$\eta 0 = KM^a$$

where a is approximately 3.6 for polyethylene. Equation (1) relates the shift in relaxation time upon blending to the ratio of the component viscosity to that of the blend and though it is based on the rheological behavior of low MW polymers, it provides a reasonable and general method for estimating $l_i$ values for polymers of higher MW. Equation (2) was used to calculate the time shift parameters for all of the examples mentioned below.

Another rheological indicator used to define the specific material properties of the present invention is the flow activation energy, Ea. Ea is calculated from dynamic oscillatory shear data collected on the same sample but at different experimental temperatures. The shift in the experimental data along the frequency axis relative to the experimental data at some reference temperature, typically 190 degrees C., is calculated. The set of temperature shift, $a_T$, and temperature data are then fit to an Arrhenius expression, $$a_T = \exp\left[\frac{E_a}{R}\left(\frac{1}{T+273.15} - \frac{1}{T_0+273.15}\right)\right]$$

where T and $T_0$ are the experimental and reference temperatures, respectively, in degrees C, and R is the ideal gas constant (see Dealy et al, *Melt Rheology and Its Role in Plastics Processing,* Van Nostrand Reinhold, 1990, page 383). Ea is calculated from the fit of the temperature shift and temperature data to the above expression.

As is known in the art, based on the response of the polymer and the mechanics and geometry of the rheometer used, the relaxation modulus G(t) or the dynamic moduli G'(w) and G"(w) can be determined as functions of time t or frequency w, respectively (See Dealy et al, *Melt Rheology and Its Role in Plastics Processing,* Van Nostrand Reinhold, 1990, pages 269 to 297). The mathematical connection between the dynamic and storage moduli is a Fourier transform integral relation, but one set of data can also be calculated from the other using the well known relaxation spectrum (See Wasserman, *J. Rheology*, Vol. 39, 1995, pages 601 to 625). Using a classical mechanical model, a discrete relaxation spectrum consisting of a series of relaxations or "modes", each with a characteristic intensity or "weight" and relaxation time, can be defined. Using such a spectrum, the moduli are re-expressed as:

$$G'(\omega) = \sum_{i=1}^{N} g_i \frac{(\omega \lambda_i)^2}{1+(\omega \lambda_i)^2}$$

$$G''(\omega) = \sum_{i=1}^{N} g_i \frac{\omega \lambda_i}{1+(\omega \lambda_i)^2}$$

$$G(t) = \sum_{i=1}^{N} g_i \exp(-t/\lambda_i)$$

where N is the number of modes and $g_i$ and $\lambda_i$ are the weight and time for each of the modes (See Ferry, *Viscoelastic Properties of Polymers*, John Wiley & Sons, 1980, pages 224 to 263). A relaxation spectrum may be defined for the polymer using software such as IRIS™ Theological software, which is commercially available from IRIS™ Development. Once the distribution of modes in the relaxation spectrum is calculated, the first and second moments of the distribution, which are analogous to $M_n$ and $M_w$, the first and second moments of the molecular weight distribution, are calculated as follows:

$$g_I = \sum_{i=1}^{N} g_i \bigg/ \sum_{i=1}^{N} g_i/\lambda_i$$

$$g_{II} = \sum_{i=1}^{N} g_i \lambda_i \bigg/ \sum_{i=1}^{N} g_i$$

RSI is defined as gII/gI. Further, nRSI is calculated from RSI as described in U.S. Pat. No. 5,998,558, according to nRSI=RSI×MI^a where a is approximately 0.6. The nRSI is effectively the RSI normalized to an MI of 1.0, which allows comparison of rheological data for polymeric materials of varying MIs. Because RSI and nRSI are sensitive to such parameters as a polymer's molecular weight distribution, molecular weight, and long chain branching, it is a sensitive and reliable indicator of the stress relaxation, as well as the shear thinning behavior, of the polymer. The higher the value of nRSI, the broader the relaxation time distribution of the polymer, therefore the greater its ability to perform as a shear thinning agent.

Polyolefin, as that term is used herein, is a thermoplastic resin. Each polyolefin or mixture of polyolefins is selected according to the parameters defined above. The polyolefin can be a homopolymer or a copolymer produced from two or more comonomers, or a blend of two or more of these polymers, conventionally used as jacketing and/or insulating materials in wire and cable applications. The polymers can be crystalline, amorphous, or combinations thereof. They can also be block or random copolymers. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitrites such as acrylonitrile, methacrylonitrile, and alpha-chloroacry-lonitrile; vinyl methyl ketone, vinyl methyl ether, vinylidene chloride, maleic anhydride, vinyl chloride, vinylidene chloride, vinyl alcohol, tetrafluoroethylene, and chlorotri-fluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetra-fluoroethylene. The homopolymers and copolymers of ethylene and propylene are preferred, both in the non-halogenated and halogenated form. Included in this preferred group are terpolymers such as ethylene/propylene/diene monomer rubbers.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. Polypropylene can be prepared by conventional processes such as the process described in U.S. Pat. No. 4,414,132. Preferred polypropylene alpha-olefin comonomers are those having 2 or 4 to 12 carbon atoms.

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.965 gram per cubic centimeter. They also can have a melt index in the range of about 0.1 to greater than about 100 grams per 10 minutes. A granular polyethylene is preferable.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter, and metallocene copolymers with various densities. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms, The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 0.2 to about 180 grams per 10 minutes, and is preferably in the range of about 0.5 to about 5 grams per 10 minutes. The HDPE can include both homopolymers and copolymers of ethylene and one or more alpha-olefins having 3 to 12 carbon atoms and preferably 3 to 8 carbon atoms. The density of the HDPE can include MDPE, but is generally in the range of 0.940 to 0.965 gram per cubic centimeter. The melt index can be in the range of about 0.1 to about 160 grams per 10 minutes, and is preferably in the range of about 0.1 to about 8 grams per 10 minutes. The alpha-olefins for LLDPE and HDPE can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 0.1 to about 45 grams per 10 minutes, and preferably has a melt index in the range of about 0.1 to about 5 grams per 10 minutes. Melt index is determined under ASTM D-1238, Condition E. It is measured at 190 degrees C. and 2160 grams.

A mixture of components (A) and (B) or component (C) together with selected additives is thoroughly melt mixed or compounded in conventional plastics compounding equipment and is then pelletized for use in insulation fabrication equipment. Such melt processing is typically performed at a temperature in the range of about 150 to about 200 degrees C. Melt compounding equipment includes single stage mixers that both melt, mix and pump the material through a pelleting die system such as twin screw compounders or single screw mixing extruders. Also included are two stage continuous and batch mixing systems, in which melting and most of the mixing are accomplished in a fluxing/mixing unit before discharging into a melt pumping device. Two stage continuous mixers include equipment as the Farrel™ FCM or Japan Steel Works™ JSW, while an example of a batch mixer is the Farrel Banbury™ type. Alternatively, the proper ratios of one or more constituents is combined at the fabricating extruder, typically by metering feeds of pelleted materials or by utilizing a dry blend of the constituent materials. The term "expandable resin composition" means that, in addition to components (A) and (B) or (C), the composition is such that, under physical or chemical foaming conditions, the resin composition will expand or foam.

For polyolefin applications, typical melt processing temperatures during the insulation extrusion process are in the range of about 140 to about 230 degrees C. The media to be coated with foamed insulation can be a metallic electrical conductor or optic fiber, or a core containing two or more of same, or possibly other substrates on which a foamed coating is desired. This media is typically traveling perpendicular to the fabricating extruder through a coating crosshead die assembly located at the discharge end of the fabricating extruder. The coating crosshead turns the melt flow and creates a flow surrounding the media to be coated, with a coating die utilized for the final shaping of the melt. The gases in the polymer melt foam at the lower pressures in the coating die and especially in the air gap between the die exit and the cooling troughs. Water is typically used as the coolant in the cooling troughs used to solidify the foamed insulation on, for example, metallic conductors, or other media. As previously outlined, gas injection foaming is used to obtain cellular insulations with expansion levels of 80 percent or more by volume.

In a physical foaming process, the expandable resin composition is continuously fed into an extruder adapted to melt the resin and simultaneously introduce an inert gas that is injected into the melt under pressure. The inert gas, for example nitrogen, is introduced to the extruder in an amount of about 0.01 to about 10 parts by weight of inert gas per 100 parts by weight of expandable resin composition. Other inert gases that can be use include helium, neon, krypton, xenon, radon, and carbon dioxide. Nitrogen and carbon dioxide are preferred. An optimal extrusion configuration provides sufficient mixing and residence time for the gas to uniformly dissolve into the melt. As the melt is coated onto the wire and exits the high pressure extruder environment through the coating die, the composition becomes supersaturated and gas bubbles nucleate to form a foamed insulation. This foaming primarily occurs in the air gap between the coating die and a water trough providing cooling and solidification of the foamed insulation. Foaming levels can be adjusted by changing gas injection level, adjusting extrusion conditions and by using a movable water trough to adjust the length of air gap before the water quenching.

Various conventional additives can be added to the expandable resin composition prior to or during the mixing of the components, and prior to or at the time of the fabrication extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Blowing agents are added where chemical foaming is desired. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl) methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl phosphonite; thio compounds such as dilaurylthiodipropionate, dimyristylthiodipropionate, and distearylthiodipropionate; various siloxanes; various amines such as polymerized 2,2,4-trimethyl-1,2-dihydroquinoline; and butylated hydroxytoluene. Antioxidants can be used in amounts of about 0.1 to about 5 parts by weight per 100 parts by weight of resin.

The expandable resin composition can be fluxed and mixed and the cable coated with expanded resin can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they can be adapted for extruding a foamed coating. An L arrangement of two extruders or a single screw extruder of L/D 30:1 to 35:1 are particularly mentioned. L/D is the ratio of length to diameter. While the expensive L arrangement of two extruders can be used, it is an advantage of the present invention that good dispersability can be achieved with a low cost single screw extruder at L/D 30:1 to 35:1. Other advantages of this extruder are good foaming; uniform cellular structure; good electrostatic tangent; and good electrostatic capacity. This extruder typically has a cross-head having a nipple and die, and a core electric conductor driver.

A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a melt screen/breaker plate assembly to remove contaminants. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The L/D of each barrel can be in the range of about 25:1 to about 35:1.

The expanded resin composition is useful in combination with electrical conductors comprised of metal such as copper or of carbon, or with communications media such as glass or plastic filaments used, for example in fiber optics applications. The term "surrounded" as it applies to a substrate such as copper wire or glass fiber being surrounded by an insulating composition, jacketing material, or other cable layer is considered to include extruding around the substrate; coating the substrate; or wrapping around the substrate as is well known by those skilled in the art.

All molecular weights are weight average molecular weights unless otherwise designated.

The patents and application mentioned in this specification are incorporated by reference herein.

The invention is illustrated by the following examples. Polymer ratios are weight ratios and percents of components are weight percents.

EXAMPLES

Measurements

Rheological measurements are done via dynamic oscillatory shear (DOS) and/or creep-recovery (CR) experiments conducted with controlled rate or controlled stress rheometers that are commercially available, for example, from TA Instruments™ or with the use of an extensional rheometer. Standard DOS or CR experiments are run in parallel plate mode under a nitrogen atmosphere at 190 degrees C.; DOS experiments to calculate Ea can be run at higher or lower temperatures, as appropriate. Sample sizes range from approximately 1100 to 1500 microns in thickness and are 4 centimeters in diameter. DOS frequency sweep experiments cover a frequency range of 0.1 to 100 $sec^{-1}$ with a 2 percent strain amplitude. The torque response is converted by the TA Instruments™ rheometer control software to dynamic moduli and dynamic viscosity data at each frequency. Discrete relaxation spectra are fit to the dynamic moduli data for each sample using the IRIS™ commercial software package. Creep-recovery tests are done with an applied creep stress of 0.1 or 1.0 kPa (kilopascal). For the low-stress test, creep and recovery times are 0.5 and 15 minutes, respectively; for the higher stress test, creep and recovery times of 3 and 15 minutes, respectively, are used. Values for η0 are calculated over a range in the data in which the time rate of change of the measured strain is constant. Density is measured according to ASTM test method D 1505.

Samples

Polymers A, K, L, M, R, T, W, CC, FF, and GG are very low density, linear low density, or high density polyethylenes made with a Ziegler-Natta catalyst by the UNIPOL™ process (Union Carbide Corporation) using a gas phase, fluidized bed reactor. They are ethylene homopolymers or copolymers of 1-butene or 1-hexene, commercially available from Union Carbide Corporation under the product designations DGDA-6944NT (8.0 MI and 0.965 density), HS-7028 (1.0 MI and 0.918 density), DMDA-8920 (20 MI and 0.954 density), HS-7093 (1.9 MI and 0.924 density), HS-7001 (3.2 MI and 0.917 density), HSE-1003 (2.5 MI and 0.917 density), DNDA-8320 (20 MI and 0.924 density), DMDA-8907 (6.5 MI and 0.952 density), HS-7002 (2.0 MI and 0.917 density), and DGDM-6923 (8.0 MI and 0.965 density), respectively. Polymer I is a copolymer of ethylene and 1-butene with a 2.0 MI and a 0.917 density.

The values for MI (melt index) are in grams per 10 minutes and the values for density are in grams per cubic centimeter. Melt index is determined under ASTM D-1238, Condition E. It is measured at 190 degrees C. and 2.16 kilograms.

Polymers J, V, X, Y,Z, and DD are linear low density, medium density, or high density polyethylenes made with a chrome catalyst by the UNIPOL™ process (Union Carbide Corporation) using a gas phase, fluidized bed reactor. They are ethylene homopolymers or copolymers of 1-butene or 1-hexene, and are commercially available from Union Carbide Corp. under the product designations DFDA-7540NT (0.7 MI and 0.920 density), DGDA-3485NT (0.8 MI and 0.945 density), DGDA-7580NT (0.1 MI and 0.945 density), DGDK-3364NT (0.8 MI and 0.95 density), DMDH-6400 (0.9 MI and 0.961 density), and DHDA-2463NT (0.6 MI and 0.939 density), respectively.

Polymer C is a low-density polyethylene made by a gas phase, fluidized bed reaction in a staged reactor configuration using a Ziegler-Natta catalyst. Polymer C has a 0.9 MI and a 0.922 density.

Polymers S and U are samples of EXCEED™ 357C80 (3.4 MI and 0.917 density) and EXCEED™ 377D60 (1.0 MI and 0.922 density) polyethylenes, commercially available from ExxonMobil Chemical Company.

Polymers H, EE, HH, and II are samples of ENGAGE™ 8913 (7.0 MI and 0.880 density), ENGAGE™ 8200 (5.0 MI and 0.870 density), AFFINITY™ PL1845 (3.5 MI and 0.910 density), and AFFINITY™ FM1570 (1.0 MI and 0.915 density) polyethylenes, commercially available from The Dow Chemical Company.

Polymers D and F are propylene homopolymers and Polymers E and G are propylene random copolymers with ethylene made with a Ziegler-Natta catalyst by the UNIPOL™ process (Union Carbide Corporation) using a gas phase, fluidized bed reactor. Polymers D and F have, respectively, 1.2 and 3.9 MIs with densities typically about 0.900 to about 0.910; Polymers E and G have, respectively, 0.8 and 3.3 MIs with densities typically about 0.890 to about 0.905.

Polymers B, N, O, P, Q, AA, and BB are polyethylenes made by high-pressure, free radical polymerization. These low density polyethylenes are produced in a high-pressure, tubular reactor using multiple organic initiators, pressures up to 3000 atmospheres and temperatures up to 320 degrees C. The process used to produce these high-pressure, low density polyethylenes is similar to that described in Zabisky et al, *Polymer*, 33, No. 11, 2243, 1992. Polymer B has a 2.0 MI and a 0.918 density, Polymers N, O, P, Q have, respectively, a 5.0 MI and a 0.917 density, a 7.0 MI and a 0.918 density, a 0.3 MI and a 0.918 density, and a 0.2 MI and a 0.921 density. Polymers AA and BB have, respectively, a 3.0 MI and a 0.924 density and a 3.5 MI and a 0.922 density.

Additives A and B are nucleating agent masterbatch products DFNA-0012NT and DFNA-0078NT, respectively, commercially available from Union Carbide Corporation. Additive C is a foam concentrate product Spectratech™ FM-1253W, commercially available from Ampacet Corporation. CaSt, PTFE, and Wax are calcium stearate 2115, Viton™ A (grade 10), and EPOLENE™ N-15 wax, commercially available from Mallinckrodt Chemical Company, Du Pont Chemical Company, and Eastman Chemical Company, respectively.

Extrudability

Extrudability, in the context of the present invention, will focus upon the capability of a polymeric material to extrude as a high speed thin wall insulation with a surface that is smooth and otherwise without surface defects. Capability to extrude at high speeds is critical for producing high quality foamed insulation in both the chemical foam and gas injection thin wall cellular insulation foam processes. Where multiple insulation layers are extruded, roughness and surface defects at an internal interface will also impair the insulation quality. These imperfections have the potential to propagate to external surfaces and will, regardless of external surface smoothness, contribute to increased variation in insulation uniformity and corresponding increase in variability of electrical transmission characteristics.

It is therefore possible to specify preferred extruder and line speed conditions and then extrude a polymeric material through a crosshead die and onto a copper wire, for example, to evaluate its extrudability based on its surface quality. For the purposes of the present invention, surface appearance has been rated qualitatively from 1 to 10 with 10 being the best and 1 being the worst. In particular, the following descriptions accompany the numerical ratings:

| Surface Appearance Rating | Description |
| --- | --- |
| 10 | slick, no discernible rough spots |
| 9 | slick, few tiny rough spots |
| 8 | very smooth, some tiny rough spots |
| 7 | smooth, tiny rough spots |
| 6 | fair smoothness, similar to 300 grit paper |
| 5 | fair smoothness, similar to 200 grit paper |
| 4 | poor smoothness, similar to 150 grit paper |
| 3 | poor smoothness, similar to 100 grit paper |
| 2 | very poor smoothness, similar to 80 grit paper |
| 1 | very poor smoothness, similar to 50 grit paper |

In general, a rating of 5 or better is said to be acceptable in terms of subject invention, 7 or better preferred, and 9 or above most preferred.

Tables I and II disclose examples of polymer components and blends. All polymeric materials listed in Tables I and II are extruded through a 2½ inch, 24/1 L/D (length to diameter) extruder at approximately 1200 feet per minute through a crosshead die and onto 24 AWG (American Wire Gauge) copper wire. The extrusion temperature profile is as follows: zone 1: 330 zone 2: 350 degrees F.; zone 3: 370 degrees F.; zone 4: degrees F.; zone 5: 390 degrees F; die: 390 degrees F. For example the 70/30 blend of Polymers A and B, a polymer blend typical of commercial gas injection foamed coaxial cable insulation production, shows inferior and unacceptable thin wall insulation extrudability. Addition to that blend of a suitable shear thinning agent at a level within the formulation range, for example, of 6 to 22 percent by weight of Polymers C, D, E, F, or G improves substantially the extrudability of the formulation, such that the final polymeric material has extrudability in the acceptable, preferred, or most preferred ranges. Alternatively, addition of 2 percent by weight of Polymer E or 10 to 18 percent by weight of Polymers H, I, J, K, or L fails to provide suitable enhancements to the extrudability relative to the 70/30 blend of Polymers A and B.

An additionally useful illustration can be had by comparing the results for the 70/30 blend of Polymers A and M with those for a similar mixture modified with a suitable shear thinning agent at a level within a critical formulation range, for example 12 percent by weight of Polymers E or G. Addition of the shear thinning agent improves substantially the extrudability of the formulation, such that the final polymeric material has extrudability in the acceptable, preferred, or most preferred ranges. Alternatively, addition of 12 percent by weight Polymer K fails to provide suitable enhancements to the extrudability relative to the 70/30 blend of Polymers A and M. Further, materials often used to improve extrudability, such as low molecular weight polypropylene wax, calcium stearate (CaSt), and a fluoropolymer processing additive, such as polytetrafluoroethylene (PTFE) for example, fail to improve the extrusion performance of the polymeric materials of subject invention at high processing speeds. Tables I and II disclose other polymeric materials, which show extrudability in the acceptable, preferred, or most preferred ranges, though foamability for those materials will be shown to be unacceptable.

Foamability

Optimal polymeric materials for thin wall cellular insulation should have good extrudability such that they can produce an insulation with a smooth surface at high speed conditions, but they must also possess good foaming capability. The material's capability to be expanded into a quality foamed insulation is evaluated in foamed insulation experiments performed on a physical gas injection extrusion line. The ability of the polymeric material to foam and maintain a quality foamed or cellular insulation is delineated by the degree of expansion and degree of consistency of capacitance and diameter, as well as by visual inspection of the final insulation. As is well known in the art, the degree of expansion is often monitored by and correlated to the measured capacitance of the foamed or cellular insulation. When pairs of insulated wires are twisted together to form a transmission circuit a capacitance mismatch will detrimentally effect electrical properties. A consistent capacitance ensures less operator involvement in changing process variables and consequentially lower scrap rates because of more in-spec foamed insulation.

Tables III, IV, and V. disclose examples of polymer components and blends evaluated in terms of foamability. Degree or percentage of expansion is included in the Tables, along with a rating to describe the overall quality of the expanded insulation. Ratings ranging from Poor(−) to Good (+) are accompanied by the following descriptions:

| Overall Foam Quality | General Description of Foamed/Cellular Insulation |
| --- | --- |
| Good(+) | small (50–100 microns) uniformly distributed cells, minor capacitance and diameter variation (±0.1 pF/ft, ±5–10 mils); high expansion (Series 11: 70–75%) |
| Good(−) | small (50–100 microns) uniformly distributed cells with some larger cells (100–150 microns); high expansion (Series 11: 68–71%), a little poorer capacitance stability (±0.1 to 0.5 pF/ft) |
| Fair(+) | larger cells (100–150 microns); reasonable expansion (Series 11: 62–68%), insulation can be out of round (diameter: ±25 mils) |
| Fair(−) | larger cells (100–150 microns); expansion of 55–62% (Series 11:), out of round insulation (diameter: ±25 mils) and/or large void in foam structure |
| Poor(+) | lower expansion (Series 11: 48–55%) |
| Poor(−) | very low expansion (48% or less) |

In general a rating of Fair(+) or greater is said to be acceptable, Good(−) preferred, and Good(+) most preferred.

All polymeric materials listed in Tables III, IV, and V are extruded through a 2½ inch, 24:1 L/D extruder at approximately 100 feet per minute through a crosshead die. The extrusion temperature profile is as follows: zone 1: 302 degrees F.; zone 2: 347 degrees F.; zone 3: 356 degrees F.; zone 4: 347 degrees F.; zone 5: 347 degrees F.; die: 347 degrees F. The melt temperature is approximately 350 to 355 degrees F.

Table III discloses foamability data using a coaxial cable insulation model system often referred to as CATV drop cable, Series 11. In particular a crosshead die size of 3.5 millimeters is used to apply a foamed or cellular insulation based on a particular polymeric material of 7.11 millimeters onto a copper wire of 1.62 millimeters diameter (14 AWG). The 70/27 blends of Polymer A/Polymer B, for example, produce a foamed or cellular insulation that shows 68.5 to 76 percent expansion or a capacitance of approximately 14 picofarads per foot and overall ratings of Good(+). The addition of 12 to 18 percent by weight of Polymers C, D, G, or H does not detract from the overall quality of the foamed or cellular insulation or the degree of expansion to result in an overall rating below Fair (+). In some cases even a higher degree of expansion or lower capacitance might be achieved. Polymers C, D, G, H, or K as shear thinning agents can improve the extrudability based on its rheological properties maintaining at least acceptable, if not preferred or most preferred, foamability of the same polymeric material. As a further illustration, replacement of Polymer B with an alternate HP-LDPE (high pressure, low density polyethylene) such as, for example, Polymers N, O, P, or Q, produces a foamed or cellular insulation of comparable quality and degree of expansion to the 60/35, 70/25, and 70/27 blends of Polymers A and B. HP-LDPE is at a specific level and of appropriate rheological properties such that the rheological properties of the blend fall within preferred criteria. As a still further illustration, replacement of Polymer B in the A/B blends with LLDPE (linear low density polyethylene), such as, for example, approximately 27 percent by weight of Polymers M, K, R, or S produces a foamed or cellular insulation of somewhat less quality and degree of expansion to the 60/35, 70/25, and 70/27 blends (weight ratios) of Polymers A and B, but still meets the minimum criteria defined. The LLDPE is at a specific level and of appropriate rheological properties such that the rheological properties of the blend fall within preferred criteria.

As alternative examples, addition of 22 percent by weight of shear thinning agent Polymer E; replacement of Polymer B with 27 to 28 percent by weight of LLDPE Polymer M, T, C, or U; the use of 30 to 40 percent by weight of Polymers D, E, F, or G; or replacement of Polymer A with 85 percent by weight Polymer V in the A/B blends, for example, produces an inferior foamed or cellular insulation with lower degree of expansion and/or a lower overall rating of Fair(−) or below. Those changes to the A/B blends produce a polymeric material which fails to have the rheological characteristics required to produce an acceptable, preferred, or most preferred cellular or foamed insulation.

Table IV discloses foamability data using a coaxial cable model system often referred to as CATV drop cable Series 59. A crosshead die size of 2.45 millimeter is used to apply a foamed or cellular insulation based on a particular polymeric material of 3.68 millimeters onto a copper wire of 0.813 millimeter diameter (20 AWG). The 60/35, 70/25, and 70/27 blends of Polymers A and B, for example, produce a foamed or cellular insulation that shows 60 to 70 percent expansion or a capacitance of approximately 15 picofarads per foot and overall ratings of Good(+). The addition of 2 to 20 percent by weight of shear thinning agent Polymers H, E, D, F, J, W, I, X, Y, Z, or C does not detrimentally affect the overall quality of the foamed or cellular insulation, retaining at least a Good(−) rating, or the degree of expansion, in some cases with an even higher degree of expansion or lower capacitance. Polymers H, E, D, F, J, W, I, X, Y, Z, or C as shear thinning agents can improve the extrudability based on its rheological properties while improving, or at least not detrimentally affecting, the foamability of the same polymeric material. As a further illustration, replacement of Polymer B with an alternative HP-LDPE such as, for example, Polymers AA, N, O, P, or BB produces a foamed or cellular insulation of comparable quality and degree of expansion to the 60/35, 70/25, and 70/27 blends (weight ratios) of Polymers A and B. The HP-LDPE is at a specific level and of appropriate rheological properties such that the rheological properties of the blend fall within preferred criteria. As a still further illustration, replacement of Polymer B in the A/B blends with LLDPE, such as, for example, 20 to 28 percent by weight of Polymers H, W, or M produces a foamed or cellular insulation of somewhat lesser quality and degree of expansion to the 60/35, 70/25, and 70/27 blends (weight ratios) of Polymers A and B, but still meets the acceptable criteria. The LLDPE is at a specific level and of appropriate rheological properties such that the Theological properties of the blend fall within preferred criteria.

As another illustration, the addition of 20 percent by weight of shear thinning agent Polymer Y, replacement of Polymer A with Polymers CC or L, for example, or replacement of Polymer B with Polymer W produces a foamed or cellular insulation with a degree of expansion that is superior to the A/B blends, but with an overall rating of Good(−) which is comparable to and acceptable to that for the A/B blends. The specific L/B, CC/B, and L/W blends are of appropriate composition and of appropriate rheological properties such that the Theological properties of the blend fall within acceptable criteria.

As an alternative example, replacement of the A/B blends with Polymer V, for example, produces an inferior foamed or cellular insulation with lower expansion of 45 to 50 percent and a lower overall rating of Poor(−). The Polymer V material fails to have the Theological characteristics required to produce an acceptable, preferred, or most preferred cellular or foamed insulation.

Table V discloses foamability data using conditions similar to those used in Table IV except for the use of the slightly larger 19 AWG copper wire. The 60/35 blend of Polymers A and B, for example, produces a foamed or cellular insulation that shows a capacitance of approximately 15 picofarads per foot and an overall rating of Good(−). The addition of 10 percent by weight of shear thinning agent Polymer J does not detrimentally affect the overall quality of the foamed or cellular insulation, retaining a Good(−) rating, or the degree of expansion, with even lower capacitance of 14.75 picofarads per foot (lower capacitance delineates superior degree of expansion). Polymer J as a shear thinning agent can improve the extrudability based on its rheological properties while improving, or at least not detrimentally affecting, the foamability of the same polymeric material. As an alternative example, replacement of Polymer B in the original blend with Polymer J produces an inferior foamed or cellular insulation, with a significantly higher capacitance of 35 to 40 picofarads per foot, leading to a Fair(−) rating. The 60/35 A/J blend fails to have the rheological characteristics required to produce an acceptable, preferred, or most preferred cellular or foamed insulation.

Examples of the Invention

Table VI discloses examples of the present invention; Table VII discloses comparative examples. Although Tables I and II disclose polyolefins or mixtures of polyolefins with acceptable, preferred, or most preferred extrudability at high line speeds and Tables III and IV disclose polyolefins or mixtures of polyolefins with acceptable, preferred, or most preferred foamability, it has been discovered that one can not arbitrarily select highly rated examples from both Tables in order to specify the composition of a polyolefin or mixture of polyolefins with the desired high speed extrudability the desired foamability. Instead, it has been discovered that such a polyolefin or mixture of polyolefins must have specific Theological properties. In one embodiment of the present invention, a polyolefin or mixture of polyolefins comprises a component (A) with a low zero-shear viscosity, high recoverable compliance, and high flow activation energy, and a component (B) with a generally high nRSI. Another embodiment of the present invention comprises a composite polyolefin or mixture of polyolefins with a low zero-shear viscosity, high recoverable compliance, high flow activation energy, and a high nRSI.

Table VI discloses examples of the invention with rheological properties satisfying acceptable, preferred, or most preferred criteria. For example, polyolefins or mixtures of polyolefins comprising a component (A) with 52 to 65 weight percent of Polymer A and 12 to 28 weight percent of Polymer B and a component (B) with 5 to 23 weight percent of Polymers C, D, E, F, G, X, or Y, along with 2 to 3 weight percent of Additives A or B, have rheological properties, extrudability at high speeds and foamability within acceptable, preferred, or most preferred ranges. Further, composite polyolefin or mixtures of polyolefins [component (C)] comprising 58 to 65 weight percent of Polymer A, 12 to 28 weight percent of Polymer B, and 5 to 23 weight percent of Polymers C, E, G, or H, along with 2 to 3 weight percent of Additives A or B, have rheological properties, extrudability at high speeds and foamability within acceptable, preferred, or most preferred ranges.

Table VII discloses comparative examples with at least one rheological property that does not fall within acceptable, preferred, or most preferred ranges of the present invention. For example, a polyolefin or mixtures of polyolefins comprising a component (A) with 68 weight percent of Polymer A and 28 weight percent of Polymer B and a component (B) with 2 weight percent of Polymers D or E, along with 2 weight percent of Additive A, have extrudability at high speeds that fails to fall within acceptable, preferred, or most preferred ranges. Further, a polyolefin or a mixture of polyolefins comprising a component (A) with 52 to 70 weight percent of Polymer A and 15 to 28 weight percent of Polymer B and a component (B) with 2 to 18 weight percent of Polymers E, H, I, J, or K, along with 2 to 5 weight percent of Additives A or C, have at least one of the specified rheological properties, plus extrudability at high speeds and/or foamability that fail to fall within acceptable, preferred, or most preferred ranges. Still further, composite polyolefins or mixtures of polyolefins [component (C)] comprising 70 weight percent of Polymer A and 28 weight percent of Polymer B, or 58 weight percent of Polymer A, 28 weight percent of Polymer M, and 12 weight percent of Polymer G, along with 2 weight percent of Additive A, have at least one of the specified rheological properties, plus extrudability at high speeds and/or foamability that fail to fall within acceptable, preferred, or most preferred ranges.

TABLE I

Extrudability Summary (overall ratings of 5 to 10).

| A | B | Overall Rating |
|---|---|---|
| 100% Polymer C | | 9–10 |
| 91% Polymer Y | 9% Polymer D | 9–10 |
| 91% Polymer Y | 9% Polymer F | 9–10 |
| 60% Polymer L | 40% Polymer C | 9–10 |
| 60% Polymer A | 40% Polymer G | 9–10 |
| 52% Polymer A/30% Polymer B | 18% Polymer C | 9–10 |
| 100% Polymer H | | 8 |
| 100% Polymer Y | | 8 |
| 95% Polymer Y | 5% Polymer G | 8 |
| 91% Polymer Y | 9% Polymer E | 8 |

TABLE I-continued

Extrudability Summary (overall ratings of 5 to 10).

| A | B | Overall Rating |
|---|---|---|
| 91% Polymer Y | 9% Polymer G | 8 |
| 65% Polymer A/12% Polymer B | 23% Polymer G | 8 |
| 58% Polymer A/30% Polymer B | 12% Polymer E | 8 |
| 58% Polymer A/30% Polymer B | 12% Polymer G | 8 |
| 100% Polymer DD | | 7 |
| 100% Polymer C | | 7 |
| 61% Polymer A/30% Polymer B | 9% Polymer G | 7 |
| 60% Polymer Y | 40% Polymer E | 7 |
| 58% Polymer A/30% Polymer B | 12% Polymer C | 7 |
| 58% Polymer A/30% Polymer B | 12% Polymer G | 7 |
| 58% Polymer A/30% Polymer M | 12% Polymer E | 7 |
| 100% Polymer Z | | 5–6 |
| 64% Polymer A/30% Polymer B | 6% Polymer E | 5–6 |
| 64% Polymer A/30% Polymer B | 6% Polymer F | 5–6 |
| 65% Polymer A/25% Polymer B | 10% Polymer Y | 5–6 |
| 65% Polymer A/25% Polymer B | 10% Polymer X | 5–6 |
| 64% Polymer A/30% Polymer B | 6% Polymer G | 5–6 |
| 64% Polymer A/30% Polymer B | 6% Polymer D | 5–6 |
| 65% Polymer A/12% Polymer B | 23% Polymer E | 5–6 |
| 63% Polymer A | 37% Polymer J | 5–6 |
| 60% Polymer A | 40% Polymer E | 5–6 |
| 58% Polymer A/30% Polymer M | 12% Polymer G | 5–6 |
| 58% Polymer A/30% Polymer B | 12% Polymer E | 5–6 |
| 50% Polymer A/12% Polymer B | 38% Polymer D | 5–6 |

TABLE II

Extrudability Summary (overall ratings of 1 to 4).

| A | B | Overall Rating |
|---|---|---|
| 100% Polymer EE | | 3–4 |
| 100% Polymer B | | 3–4 |
| 100% Polymer BB | | 3–4 |
| 100% Polymer L | | 3–4 |
| 74% Polymer A/16% Polymer B | 10% Polymer J | 3–4 |
| 68% Polymer A/30% Polymer M | 2% Polymer G | 3–4 |
| 65% Polymer A/25% Polymer B | 10% Polymer H | 3–4 |
| 58% Polymer A/30% Polymer U | 12% Polymer G | 3–4 |
| 58% Polymer A/30% Polymer B | 12% Polymer K | 3–4 |
| 53% Polymer A/29% Polymer B | 18% Polymer H | 3–4 |
| 100% Polymer K | | 1–2 |
| 100% Polymer FF | | 1–2 |
| 100% Polymer GG | | 1–2 |
| 100% Polymer A | | 1–2 |
| 100% Polymer HH | | 1–2 |
| 100% Polymer II | | 1–2 |
| 70% Polymer A/30% Polymer B | 0.15% CaSt | 1–2 |
| 70% Polymer A/30% Polymer B | 0.04% PTFE | 1–2 |
| 70% Polymer A | 30% Polymer B | 1–2 |
| 70% Polymer A | 30% Polymer M | 1–2 |
| 65% Polymer A/25% Polymer B | 10% Polymer I | 1–2 |
| 64% Polymer A/30% Polymer B | 6% Wax | 1–2 |
| 60% Polymer A | 40% Polymer F | 1–2 |
| 58% Polymer A/30% Polymer B | 12% Polymer L | 1–2 |

TABLE III

Foamability Summary (Series 11).

| A | B | Additive Component | % Exp | Overall Rating |
|---|---|---|---|---|
| 70% Polymer L | 27% Polymer B | 3% Additive A | 74 | Good (+) |
| 70% Polymer A | 27% Polymer O | 3% Additive A | 77 | Good (+) |
| 70% Polymer A | 27% Polymer B | 3% Additive B | 71 | Good (+) |
| 70% Polymer A | 27% Polymer B | 3% Additive A | 72 | Good (+) |
| 70% Polymer L | 27% Polymer P | 3% Additive A | 76 | Good (−) |
| 70% Polymer L | 27% Polymer Q | 3% Additive A | 74 | Good (−) |
| 70% Polymer L | 27% Polymer B | 3% Additive A | 75 | Good (−) |
| 70% Polymer CC | 27% Polymer N | 3% Additive A | 74 | Good (−) |
| 58% Polymer A/27% Polymer B | 12% Polymer D | 3% Additive B | 65 | Good (−) |
| 52% Polymer A/28% Polymer B | 18% Polymer H | 2% Additive A | 72 | Good (−) |
| 98% Polymer B |  | 2% Additive A | 69 | Fair (+) |
| 97% Polymer A |  | 3% Additive B | 68 | Fair (+) |
| 70% Polymer A | 27% Polymer R | 3% Additive B | 69 | Fair (+) |
| 70% Polymer A | 27% Polymer S | 3% Additive B | 69 | Fair (+) |
| 70% Polymer A | 27% Polymer M | 3% Additive B | 68 | Fair (+) |
| 70% Polymer A | 27% Polymer K | 3% Additive B | 63 | Fair (+) |
| 63% Polymer A/12% Polymer B | 22% Polymer D | 3% Additive B | 67 | Fair (+) |
| 63% Polymer A/12% Polymer B | 22% Polymer G | 3% Additive B | 63 | Fair (+) |
| 58% Polymer A/28% Polymer B | 12% Polymer K | 2% Additive A |  | Fair (+) |
| 58% Polymer A/27% Polymer B | 12% Polymer G | 3% Additive B | 67 | Fair (+) |
| 52% Polymer A/28% Polymer B | 18% Polymer C | 2% Additive A | 68 | Fair (+) |
| 70% Polymer A | 28% Polymer M | 2% Additive A |  | Fair (−) |
| 70% Polymer A | 27% Polymer T | 3% Additive B | 67 | Fair (−) |
| 81% Polymer A | 16% Polymer D | 3% Additive B |  | Poor (+) |
| 70% Polymer A | 27% Polymer C | 3% Additive B | 51 | Poor (+) |
| 58% Polymer A/28% Polymer U | 12% Polymer E | 2% Additive A |  | Poor (+) |
| 58% Polymer A/10% Polymer B | 30% Polymer E | 2% Additive A |  | Poor (+) |
| 85% Polymer V | 12% Polymer B | 3% Additive B | 43 | Poor (−) |
| 81% Polymer A | 16% Polymer G | 3% Additive B |  | Poor (−) |
| 81% Polymer A | 16% Polymer F | 3% Additive B |  | Poor (−) |
| 68% Polymer B | 30% Polymer G | 2% Additive A |  | Poor (−) |
| 57% Polymer A | 40% Polymer D | 3% Additive B | 48 | Poor (−) |
| 57% Polymer A | 40% Polymer E | 3% Additive B | 43 | Poor (−) |
| 58% Polymer A/28% Polymer M | 12% Polymer E | 2% Additive A |  | Poor (−) |
| 58% Polymer A/28% Polymer T | 12% Polymer E | 2% Additive A |  | Poor (−) |
| 58% Polymer A/28% Polymer T | 12% Polymer G | 2% Additive A |  | Poor (−) |
| 40% Polymer A/18% Polymer B | 40% Polymer G | 2% Additive A |  | Poor (−) |
| 40% Polymer A/18% Polymer B | 40% Polymer E | 2% Additive A |  | Poor (−) |
| 57% Polymer A | 40% Polymer F | 3% Additive B | N/A | gas escape |
| 57% Polymer A | 40% Polymer G | 3% Additive B | N/A | gas escape |

TABLE IV

Foamability Summary (Series 59).

| A | B | Additive Component | % Exp | Overall Rating |
|---|---|---|---|---|
| 70% Polymer A | 28% Polymer H | 2% Additive A | 61 | Good (+) |
| 70% Polymer A | 27% Polymer B | 3% Additive A | 70 | Good (+) |
| 70% Polymer A | 25% Polymer B | 5% Additive C | 60 | Good (+) |
| 68% Polymer A/30% Polymer B | 5% Polymer E | 2% Additive A | 60 | Good (+) |
| 68% Polymer A/30% Polymer B | 5% Polymer D | 2% Additive A | 58 | Good (+) |
| 68% Polymer A/30% Polymer B | 5% Polymer F | 2% Additive A | 62 | Good (+) |
| 64% Polymer A/24% Polymer B | 10% Polymer H | 2% Additive A | 59 | Good (+) |
| 63% Polymer A/25% Polymer B | 10% Polymer F | 2% Additive A |  | Good (+) |
| 63% Polymer A/25% Polymer B | 10% Polymer D | 2% Additive A |  | Good (+) |
| 60% Polymer A | 35% Polymer O | 5% Additive C | 71 | Good (+) |
| 60% Polymer A | 35% Polymer N | 5% Additive C | 71 | Good (+) |
| 60% Polymer A | 35% Polymer AA | 5% Additive C |  | Good (+) |
| 60% Polymer A | 35% Polymer B | 5% Additive C | 67 | Good (+) |
| 60% Polymer A/28% Polymer B | 10% Polymer E | 2% Additive A | 59 | Good (+) |
| 60% Polymer A/28% Polymer B | 10% Polymer D | 2% Additive A | 63 | Good (+) |
| 60% Polymer A/28% Polymer B | 10% Polymer F | 2% Additive A | 63 | Good (+) |
| 77% Polymer A | 20% Polymer W | 3% Additive C | 67 | Good (−) |
| 71% Polymer A/27% Polymer B | 2% Polymer D | 2% Additive A |  | Good (−) |
| 70% Polymer A | 28% Polymer W | 2% Additive A | 62 | Good (−) |
| 70% Polymer A | 28% Polymer M | 2% Additive A | 60 | Good (−) |
| 70% Polymer A | 27% Polymer BB | 3% Additive A | 72 | Good (−) |
| 70% Polymer A/15% Polymer B | 10% Polymer J | 5% Additive C | 55 | Good (−) |
| 70% Polymer A/15% Polymer B | 10% Polymer W | 5% Additive C | 55 | Good (−) |

TABLE IV-continued

Foamability Summary (Series 59).

| A | B | Additive Component | % Exp | Overall Rating |
|---|---|---|---|---|
| 70% Polymer A/15% Polymer B | 10% Polymer I | 5% Additive C | 60 | Good (−) |
| 68% Polymer A/30% Polymer B | 2% Polymer E | 2% Additive A | 62 | Good (−) |
| 68% Polymer A/30% Polymer B | 2% Polymer D | 2% Additive A | 60 | Good (−) |
| 64% Polymer A/24% Polymer B | 10% Polymer X | 2% Additive A | 63 | Good (−) |
| 64% Polymer A/24% Polymer B | 10% Polymer Y | 2% Additive A | 62 | Good (−) |
| 64% Polymer A/24% Polymer B | 10% Polymer Z | 2% Additive A | 62 | Good (−) |
| 64% Polymer A/24% Polymer B | 10% Polymer C | 2% Additive A | 60 | Good (−) |
| 60% Polymer L | 35% Polymer B | 5% Additive C | 68 | Good (−) |
| 60% Polymer CC | 35% Polymer B | 5% Additive C | 69 | Good (−) |
| 60% Polymer A | 35% Polymer P | 5% Additive C | | Good (−) |
| 77% Polymer L | 20% Polymer W | 3% Additive C | 66 | Fair (+) |
| 56% Polymer A/24% Polymer B | 20% Polymer Y | 0.3% PTFE | 69 | Fair (+) |
| 98% Polymer V | | 2% Additive A | 45–50 | Poor (−) |

TABLE V

Foamability Summary (Series 59 on 19 AWG).

| A | B | Additive Component | % Exp | Overall Rating |
|---|---|---|---|---|
| 60% Polymer A | 35% Polymer B | 5% Additive C | | Good (−) |
| 60% Polymer A/25% Polymer B | 10% Polymer J | 5% Additive C | | Good (−) |
| 60% Polymer A | 35% Polymer J | 5% Additive C | | Fair (−) |

TABLE VI

Examples of the Invention.

| A | B | Additive Component | EtaO (kPa·s) | Jr (10−5/Pa) | Ea (kcal/mol) | B nRSI | Good Foamability | Good Extrudability |
|---|---|---|---|---|---|---|---|---|
| 65% Polymer A/28% Polymer B | 5% Polymer D | 2% Additive A | 1.9 | 74.3 | 7.7 | 4.7 | yes | yes |
| 65% Polymer A/28% Polymer B | 5% Polymer E | 2% Additive A | 1.9 | 74.3 | 7.7 | 9.3 | yes | yes |
| 65% Polymer A/28% Polymer B | 5% Polymer F | 2% Additive A | 1.9 | 74.3 | 7.7 | 8.3 | yes | yes |
| 64% Polymer A/24% Polymer B | 10% Polymer C | 2% Additive A | 1.5 | 78.9 | 7.5 | 9.3 | yes | yes |
| 64% Polymer A/24% Polymer B | 10% Polymer Y | 2% Additive A | 1.5 | 78.9 | 7.5 | 16.3 | yes | yes |
| 60% Polymer A/28% Polymer B | 10% Polymer E | 2% Additive A | 1.6 | 78.3 | 7.8 | 16.6 | yes | yes |
| 64% Polymer A/24% Polymer B | 10% Polymer X | 2% Additive A | 1.5 | 78.9 | 7.5 | 17.1 | yes | yes |
| 58% Polymer A/28% Polymer B | 12% Polymer C | 2% Additive A | 1.5 | 80.0 | 7.8 | 9.3 | yes | yes |
| 58% Polymer A/28% Polymer B | 12% Polymer E | 2% Additive A | 1.5 | 80.0 | 7.8 | 9.3 | yes | yes |
| 58% Polymer A/27% Polymer B | 12% Polymer G | 3% Additive B | 1.4 | 81.0 | 7.8 | 9.1 | yes | yes |
| 52% Polymer A/28% Polymer B | 18% Polymer C | 2% Additive A | 1.2 | 85.6 | 8.0 | 9.3 | yes | yes |
| 62% Polymer A/12% Polymer B | 23% Polymer G | 3% Additive B | 0.6 | 95.0 | 6.8 | 9.1 | yes | yes |

| Composite Material | Additive Component | EtaO (kPa·s) | Jr (10−5/Pa) | Ea (kcal/mol) | B nRSI | Good Foamability | Good Extrudability |
|---|---|---|---|---|---|---|---|
| 65% Polymer A/28% Polymer B/5% Polymer E | 2% Additive A | 2.8 | 81.0 | 7.8 | 9.7 | yes | yes |
| 58% Polymer A/28% Polymer B/12% Polymer E | 2% Additive A | 3.2 | 90.7 | 7.9 | 10.8 | yes | yes |
| 62% Polymer A/12% Polymer B/23% Polymer E | 3% Additive B | 4.0 | 124.5 | 7.3 | 12.0 | yes | yes |
| 58% Polymer A/28% Polymer B/12% Polymer G | 2% Additive A | 3.0 | 124.6 | 8.0 | 10.8 | yes | yes |
| 58% Polymer A/28% Polymer B/12% Polymer C | 2% Additive A | 4.1 | 82.4 | | 13.8 | yes | yes |
| 58% Polymer A/28% Polymer B/12% Polymer H | 2% Additive A | 2.9 | 75.1 | | 10.7 | yes | yes |

TABLE VII

Comparative Examples of the Invention.

| A | B | Additive Component | A EtaO (kPa·s) | A Jr (10 − 5/Pa) | A Ea (kcal/mol) | B nRSI | Good Foamability | Good Extrudability |
|---|---|---|---|---|---|---|---|---|
| 68% Polymer A/28% Polymer B | 2% Polymer D | 2% Additive A | 2.1 | 72.1 | 7.6 | 4.7 | yes | no |
| 68% Polymer A/28% Polymer B | 2% Polymer E | 2% Additive A | 2.1 | 72.1 | 7.6 | 9.3 | yes | no |
| 70% Polymer A/15% Polymer B | 10% Polymer I | 5% Additive C | 1.0 | 82.6 | 6.9 | 4.3 | yes | no |
| 70% Polymer A/15% Polymer B | 10% Polymer J | 5% Additive C | 1.0 | 82.6 | 6.9 | 24.0 | yes | no |
| 64% Polymer A/24% Polymer B | 10% Polymer H | 2% Additive A | 1.5 | 78.9 | 7.5 | 19.3 | yes | no |
| 58% Polymer A/28% Polymer B | 12% Polymer K | 2% Additive A | 1.5 | 80.0 | 7.8 | 3.6 | yes | no |
| 52% Polymer A/28% Polymer B | 18% Polymer H | 2% Additive A | 1.2 | 85.6 | 8.0 | 19.3 | yes | no |
| 60% Polymer A | 35% Polymer B | 5% Additive C | 1.1 | 70.1 | 6.0 | 18.3 | yes | no |
| 70% Polymer A | 27% Polymer B | 3% Additive A | 1.1 | 70.1 | 6.0 | 18.3 | yes | no |
| 70% Polymer A | 28% Polymer M | 2% Additive A | 1.1 | 70.1 | 6.0 | 4.3 | yes | no |
| 58% Polymer A/28% Polymer M | 12% Polymer E | 2% Additive A | 1.7 | 77.9 | 6.6 | 9.3 | no | yes |
| 58% Polymer A | 39% Polymer F | 3% Additive B | 1.1 | 70.1 | 6.0 | 8.3 | yes | no |
| 58% Polymer A | 39% Polymer E | 3% Additive B | 1.1 | 70.1 | 6.0 | 9.3 | no | yes |
| 60% Polymer A | 35% Polymer J | 5% Additive C | 1.1 | 70.1 | 6.0 | 24.0 | no | yes |
| 58% Polymer A | 39% Polymer G | 3% Additive B | 1.1 | 70.1 | 6.0 | 9.1 | no | yes |

| Composite Material | Additive Component | A EtaO (kPa·s) | A Jr (10 − 5/Pa) | A Ea (kcal/mol) | nRSI | Good Foamability | Good Extrudability |
|---|---|---|---|---|---|---|---|
| 70% Polymer A/28% Polymer B | 2% Additive A | 2.2 | 70.7 | 7.6 | 9.0 | yes | no |
| 97% Polymer A | 3% Additive B | 1.1 | 70.1 | 6.0 | 5.7 | yes | no |
| 98% Polymer V | 2% Additive A | 27.5 | 78.6 | 8.8 | 18.0 | no | yes |
| 98% Polymer B | 2% Additive A | 9.9 | 58.3 | 13.8 | 18.3 | yes | no |
| 58% Polymer A/28% Polymer M/12% Polymer G | 2% Additive A | 2.4 | 140.5 | 7.0 | 7.2 | no | yes |

What is claimed is:

1. An expandable composition comprising:
   (A) about 60 to about 98 percent by weight of a polyolefin or mixture of polyolefins wherein the polyolefin or mixture has an η0 of less than about 9.0 kilopascal.seconds (kPa.s), a Jr greater than about 50×10−5/pascals (Pa), and an Ea greater than about 6.7 kilocalories per mole (kcal/mol); and
   (B) about 2 to about 40 percent by weight of a polyolefin or mixture of polyolefins having an nRSI greater than about 4.5, and no greater than about 19.

2. The resin composition defined in claim 1 wherein component (A) is present in an amount of about 75 to about 98 percent by weight and component (B) is present in an amount of about 2 to about 25 percent by weight.

3. The resin composition defined in claim 2 wherein component (A) is present in an amount of about 88 to about 98 percent by weight and component (B) is present in an amount of about 2 to about 12 percent by weight.

4. The resin composition defined in claim 2 wherein η0 is less than about 7.0 kilopascal.seconds; Jr is greater than about 60×10−5/pascals; and nRSI is greater than about 8.

5. The resin composition defined in claim 3 wherein η0 is less than about 5.0 kilopascal.seconds; Jr is greater than about 70×10−5/pascals; and nRSI is greater than about 9.

6. An expandable composition comprising: a polyolefin or mixture of polyolefins wherein the polymer or mixture has an η0 of less than about 9.0 kilopascal.seconds, a Jr greater than about 50×10−5/pascals, an Ea greater than about 6.7 kilocalories/mole, and an nRSI greater than about 9.

7. The resin composition defined in claim 6 wherein η0 is less than about 7.0 kilopascal.seconds; Jr is greater than about 60×10−5/pascals; and nRSI is greater than about 9.5.

8. The resin composition defined in claim 6 wherein η0 is less than about 5.0 kilopascal.seconds; Jr is greater than about 70×10−5/pascals; and nRSI is greater than about 10.

9. The resin composition of claim 6, wherein the composition has an η0 of less than about 5.0 kilopascal.seconds and a Jr greater than about 70×10−5/pascals.

10. A cable comprising one or more electrical conductors, a core of electrical conductors, or communications media, at least one of the electrical conductor, communications medium, or core being surrounded by an expandable or expanded resin composition comprising:
   (A) about 60 to about 98 percent by weight of a polyolefin or mixture of polyolefins wherein the polyolefin or mixture has an η0 of less than about 9.0 kilopascal.seconds (kPa.s), a Jr greater than about 50×10−5/pascals (Pa), and an Ea greater than about 6.7 kilocalories per mole (kcal/mol); and
   (B) about 2 to about 40 percent by weight of a polyolefin or mixture of polyolefins having an nRSI greater than about 4.5, and no greater than about 19.

11. A cable comprising one or more electrical conductors, a core of electrical conductors, or communications media, at least one of the electrical conductor, communications medium, or core being surrounded by an expandable or expanded resin composition comprising: a polyolefin or mixture of polyolefins wherein the polymer or mixture has an η0 of less than about 9.0 kilopascal.seconds, a Jr greater than about 50×10−5/pascals, an Ea greater than about 6.7 kilocalories/mole, and an nRSI greater than about 9.

12. A process for providing an expandable resin composition comprising selecting (A) a polyolefin or a mixtures of polyolefins having an η0 of less than about 9.0 kilopascal.seconds, a Jr greater than about 50×10−5/pascals and an Ea greater than about 6.7 kcal/mol and (B) a polyolefin or mixture of polyolefins having an nRSI greater than about 4.5, and no greater than about 19, and forming a mixture of components (A) and (B) wherein component (A) is present in an amount of about 60 to about 98 percent by weight and component (B) is present in an amount of about 2 to about 40 percent by weight.

13. A process for providing an expandable resin composition comprising selecting (C) a polyolefin or mixture of polyolefins wherein the polyolefin or mixture has an $\eta 0$ of less than about 9.0 kilopascal.seconds, a Jr greater than about $50 \times 10^{-5}$/pascals, an Ea greater than about 6.7 kilocalories/mole, and an nRSI greater than about 9.

* * * * *